United States Patent
Song et al.

(10) Patent No.: US 12,030,455 B2
(45) Date of Patent: Jul. 9, 2024

(54) SIDE AIR BAG APPARATUS FOR VEHICLE

(71) Applicant: HYUNDAI MOBIS CO., LTD., Seoul (KR)

(72) Inventors: Jiwoon Song, Yongin-si (KR); Hae Kwon Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/347,507

(22) Filed: Jun. 14, 2021

(65) Prior Publication Data

US 2021/0402946 A1 Dec. 30, 2021

(30) Foreign Application Priority Data

Jun. 24, 2020 (KR) .......................... 10-2020-0076847

(51) Int. Cl.
*B60R 21/233* (2006.01)
*B60R 21/207* (2006.01)
*B60R 21/231* (2011.01)
*B60R 21/239* (2006.01)

(52) U.S. Cl.
CPC .......... *B60R 21/233* (2013.01); *B60R 21/207* (2013.01); *B60R 21/23138* (2013.01); *B60R 21/239* (2013.01); *B60R 2021/23146* (2013.01)

(58) Field of Classification Search
CPC ................ B60R 21/233; B60R 21/207; B60R 21/23138; B60R 21/239; B60R 2021/23146; B60R 2021/26094
See application file for complete search history.

(56) References Cited

U.S. PATENT DOCUMENTS

| | | | |
|---|---|---|---|
| 2012/0025497 A1* | 2/2012 | Yoo | B60R 21/233 280/729 |
| 2014/0151985 A1* | 6/2014 | Hotta | B60R 21/23138 280/730.2 |
| 2014/0306433 A1* | 10/2014 | Anderson | B60R 21/233 280/729 |
| 2020/0180540 A1* | 6/2020 | Fuma | B60R 21/26 |
| 2021/0354652 A1* | 11/2021 | Gerlach | B60R 21/23138 |
| 2021/0354653 A1* | 11/2021 | Lee | B60R 21/23138 |

FOREIGN PATENT DOCUMENTS

| | | | | |
|---|---|---|---|---|
| DE | 102006043552 B4 | * | 3/2009 | ........... B60R 21/239 |
| DE | 102021127465 A1 | * | 7/2022 | |
| JP | 2013184646 A | * | 9/2013 | |
| KR | 10-2014-0136747 | | 12/2014 | |
| KR | 20210156401 A | * | 12/2021 | |

OTHER PUBLICATIONS

Jonas et al. DE 10 2006 043552 Airbag for an airbag module of a motor vehicle, Machine English Translation, ip.com (Year: 2009).*
Honda et al. JP 2013-184646 Aide airbag device, Machine English Translation, ip.com (Year: 2013).*

* cited by examiner

*Primary Examiner* — Karen Beck
(74) *Attorney, Agent, or Firm* — DLA Piper LLP US

(57) ABSTRACT

A side air bag apparatus for a vehicle. The side air bag apparatus includes: a first cushion configured to cover and protect an upper body area of a passenger who has adopted a relax mode while tilting rearward a seatback; a second cushion configured to cover and protect a head area; and a valve member configured to open and close a vent hole connecting the first cushion to the second cushion. Accordingly, both the upper body area and the head area of the passenger in the relax mode are efficiently and sufficiently protected.

10 Claims, 4 Drawing Sheets

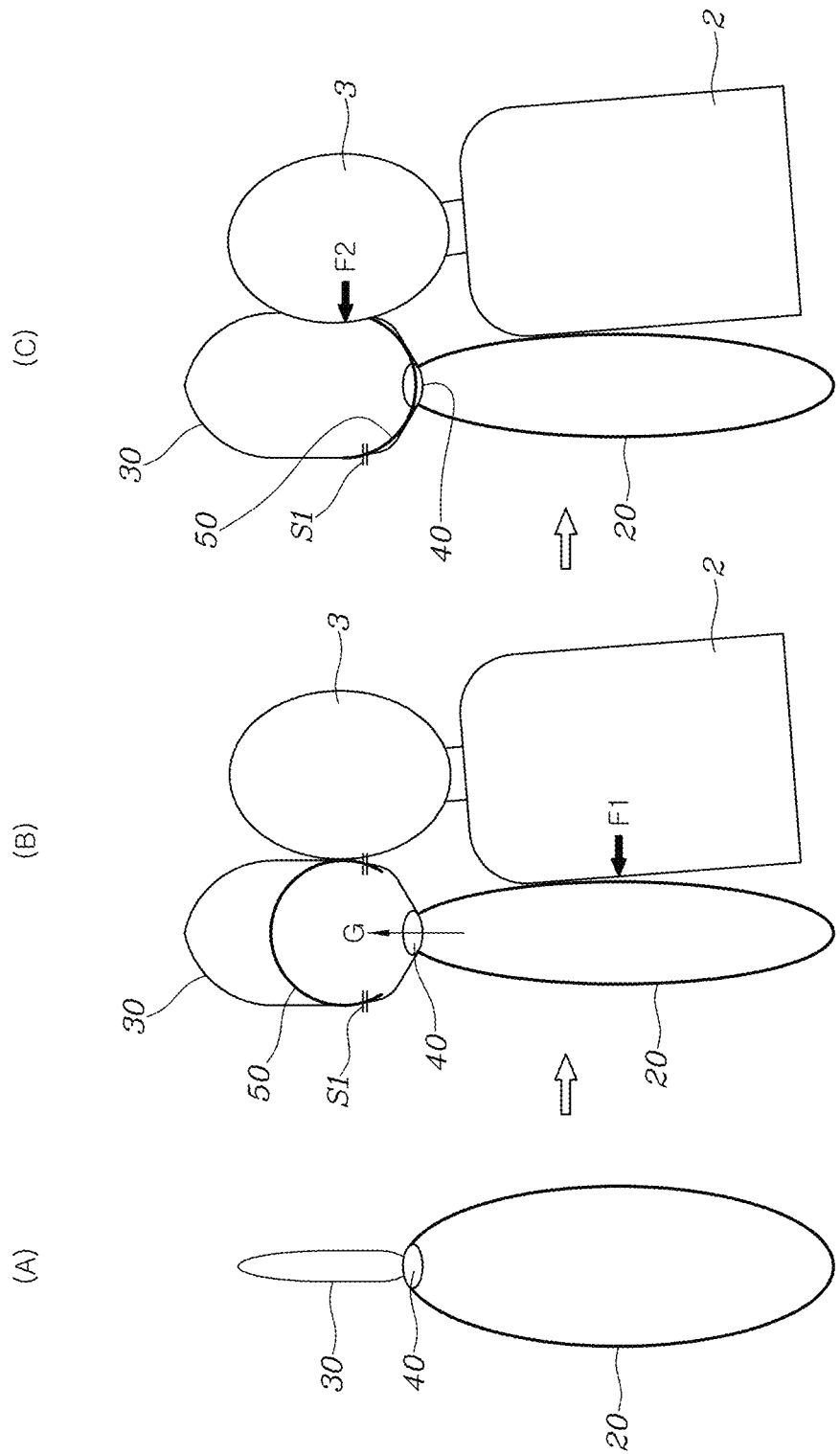

SIDE AIR BAG APPARATUS FOR VEHICLE

CROSS REFERENCE TO RELATED APPLICATION

The present application claims priority to Korean Patent Application No. 10-2020-0076847, filed Jun. 24, 2020, the entire contents of which is incorporated herein for all purposes by this reference.

BACKGROUND OF THE INVENTION

Field of the Invention

The present invention relates generally to a side air bag apparatus for a vehicle and, more particularly, to a side air bag apparatus for a vehicle, the side air bag apparatus having a dual chamber in order to efficiently protect even a passenger who has adopted a relax mode.

Description of the Related Art

In order to secure the safety of a passenger in a vehicle, vehicles include various types of air bag apparatuses. Among the various types of air bag apparatus, a side air bag apparatus is provided to protect a passenger such that the side air bag apparatus in a hiding state in a seatback is expanded to cover a side surface of the passenger when a side collision accident occurs.

Meanwhile, when autonomous driving in which a vehicle goes to its destination by itself without driver directly manipulating a steering wheel, an accelerator pedal, and brakes is universally realized, vehicle passengers including the driver may select a relax mode in which the passengers relax without worrying about driving the vehicle.

When a passenger adopts the relax mode while lying down with a rearward-tilted seatback, there is a problem that the conventional side air bag apparatus or a curtain air bag apparatus cannot efficiently protect the entire upper body of a passenger including the passenger's head against a side collision because an expanding range of the conventional air bag cushion is narrow.

There is a problem that an air bag cushion having a large volume and a large capacity inflator should be used in order to extend a protection area for protecting to the head of the passenger who has adopted the relax mode by using the conventional side air bag apparatus or the curtain air bag apparatus.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is a side air bag apparatus for a vehicle, wherein the side air bag apparatus of a dual chamber includes a first cushion configured to cover and protect an upper body area of a passenger and a second cushion configured to cover and protect the head area of the passenger. The present invention is intended to efficiently protect even a passenger who has adopted a relax mode with a rearward-tilted seatback.

Another objective of the present invention is to provide a side air bag apparatus configured to successively expand a first cushion and a second cushion by using one inflator having a small capacity, and thereby inducing cost reduction and weight reduction.

A further objective of the present invention is to provide a side air bag apparatus configured to prevent airbag gas flowing into a second cushion from back-flowing into a first cushion, thereby strengthening protection performance for the upper body and head of a passenger.

In order to achieve the above objective, the side air bag apparatus for a vehicle of the present invention includes: an inflator securely mounted to a seatback and configured to generate airbag gas; a first cushion configured to be expanded to protrude toward a side surface of the seatback by pressure of the airbag gas generated from the inflator after being folded with a hiding state in the seatback and to protect an upper body area of a passenger who has adopted a relax mode; and a second cushion connected to the first cushion and configured to be expanded by the pressure of the airbag gas transmitted thereto through the first cushion and to protect a head area of the passenger who has adopted the relax mode.

The first cushion and the second cushion may be configured such that inside portions thereof may be connected to each other through a vent hole.

The side air bag apparatus may include: a vent hole configured to connect the first cushion and the second cushion to each other; and a valve member configured to be operated to open and close the vent hole in response to pressure of the first cushion or pressure of the second cushion.

The upper body area of the passenger protected by the first cushion may be an area from shoulder to pelvis.

The head area of the passenger protected by the second cushion may be an area including neck of the passenger.

The valve member may be a flap valve, which may be located in the second cushion, have opposite ends coupled to the second cushion by sewing, and be configured such that an intermediate portion thereof between the opposite ends open and close the vent hole in response to the pressure of the first cushion or the pressure of the second cushion.

The valve member may be made of a felt material enabling sewing-coupling between the valve member and the second cushion.

In a state in which the first cushion has been expanded by the airbag gas generated from the inflator, when the pressure of the first cushion increases as a passenger's upper body presses the first cushion, the valve member may be operated to open the vent hole by the pressure transmitted from the first cushion and the airbag gas of the first cushion may be supplied to the second cushion through the vent hole, so that the second cushion may be expanded.

In a state in which the second cushion has been expanded, when the pressure of the second cushion increases as the passenger's head presses the second cushion, the valve member may be operated to seal the vent hole by the pressure of the second cushion and connection between the first cushion and the second cushion may be blocked by the valve member, so that the first and second cushions may respectively maintain internal pressures thereof.

On the basis of two sewing lines by which the opposite ends of the valve member and the second cushion may be coupled to each other, a length of the valve member located between the two sewing lines may be configured longer than a length of the second cushion including the vent hole and located between the two sewing lines, so that the valve member may seal the vent hole when the pressure of the second cushion increases as the head of the passenger presses the second cushion.

According to the present invention, the side air bag apparatus is configured to be a dual chamber including the first cushion covering and protecting the upper body area of a passenger who has adopted the relax mode with the rearward-tilted seatback and the second cushion covering and protecting the head area of the passenger. Accordingly, even a passenger in the relax mode can be efficiently protected.

The present invention is configured to expand successively the first cushion and the second cushion by using the one inflator having a small capacity, whereby cost reduction and weight reduction of the side air bag apparatus can be induced.

The present invention is configured such that, when external force is applied to the second cushion while the second cushion is expanded, the valve member located in the second cushion blocks the vent hole connecting the first cushion to the second cushion. Accordingly, the airbag gas flowing into the second cushion is prevented from backflowing into the first cushion and the first cushion and the second cushion respectively maintain internal pressure thereof, and as a result, both the upper body area and the head area of the passenger who has adopted the relax mode can be efficiently protected by the first cushion and the second cushion.

BRIEF DESCRIPTION OF THE DRAWINGS

The above and other objectives, features, and other advantages of the present invention will be more clearly understood from the following detailed description when taken in conjunction with the accompanying drawings, in which:

FIG. 4 is a view showing an expanded process of the side air bag apparatus according to the present invention.

DETAILED DESCRIPTION OF THE INVENTION

Figure 1:
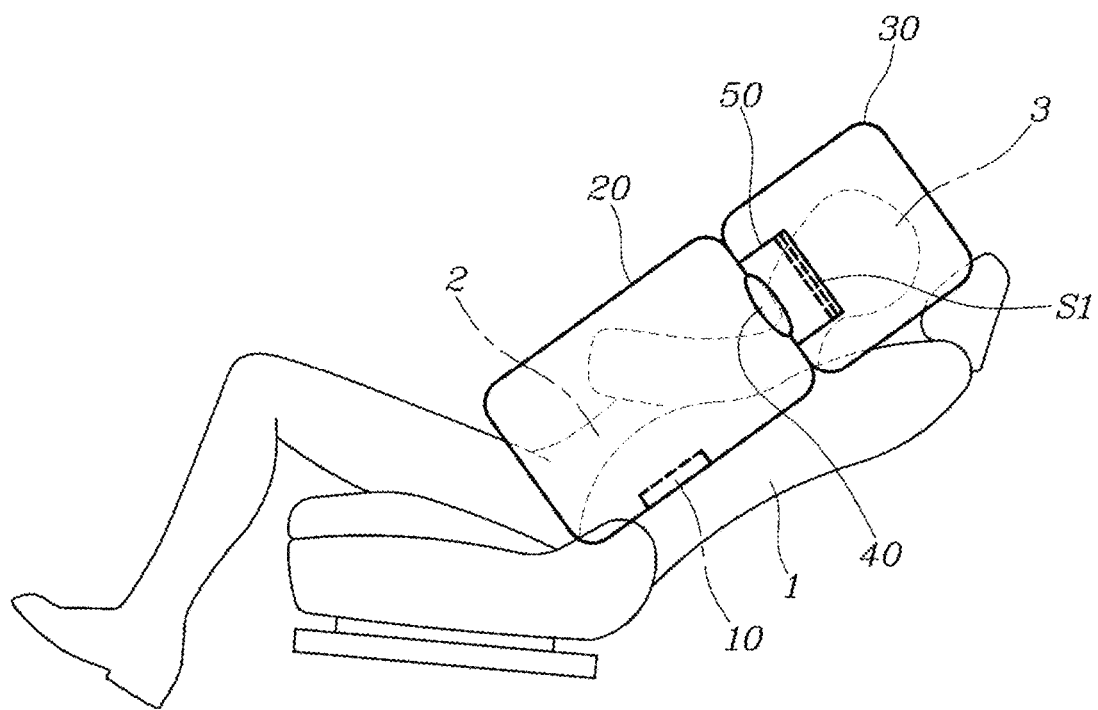
FIG. 1 is a view showing a side air bag apparatus for a vehicle according to the present invention in an expanded state from a seatback.

In the following description, the structural or functional description specified to exemplary embodiments according to the concept of the present invention is intended to describe the exemplary embodiment, so it should be understood that the present invention may be variously embodied, without being limited to the exemplary embodiments.

An embodiment described herein may be changed in various ways and various shapes, so specific embodiments are shown in the drawings and will be described in detail in this specification. However, it should be understood that the exemplary embodiment according to the concept of the present invention is not limited to the embodiment which will be described hereinbelow with reference to the accompanying drawings, but all of modifications, equivalents, and substitutions are included in the scope and spirit of the invention.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing a particular embodiment only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

A control part (controller) according to the exemplary embodiment of the present invention may be realized by a nonvolatile memory (not shown), which consists of an algorithm configured to control operations of various components of a vehicle or data regarding software instructions to play the algorithm, and a processor (not shown), which is configured to perform operations described below using the data stored in the memory. Here, the memory and processor may be realized as separate chips. Alternately, the memory and processor may be realized as an integrated single chip. The processor may take one or more form.

Hereinbelow, a side air bag apparatus for a vehicle according to an exemplary embodiment of the present invention will be described with reference to accompanying drawings.

Figure 2:
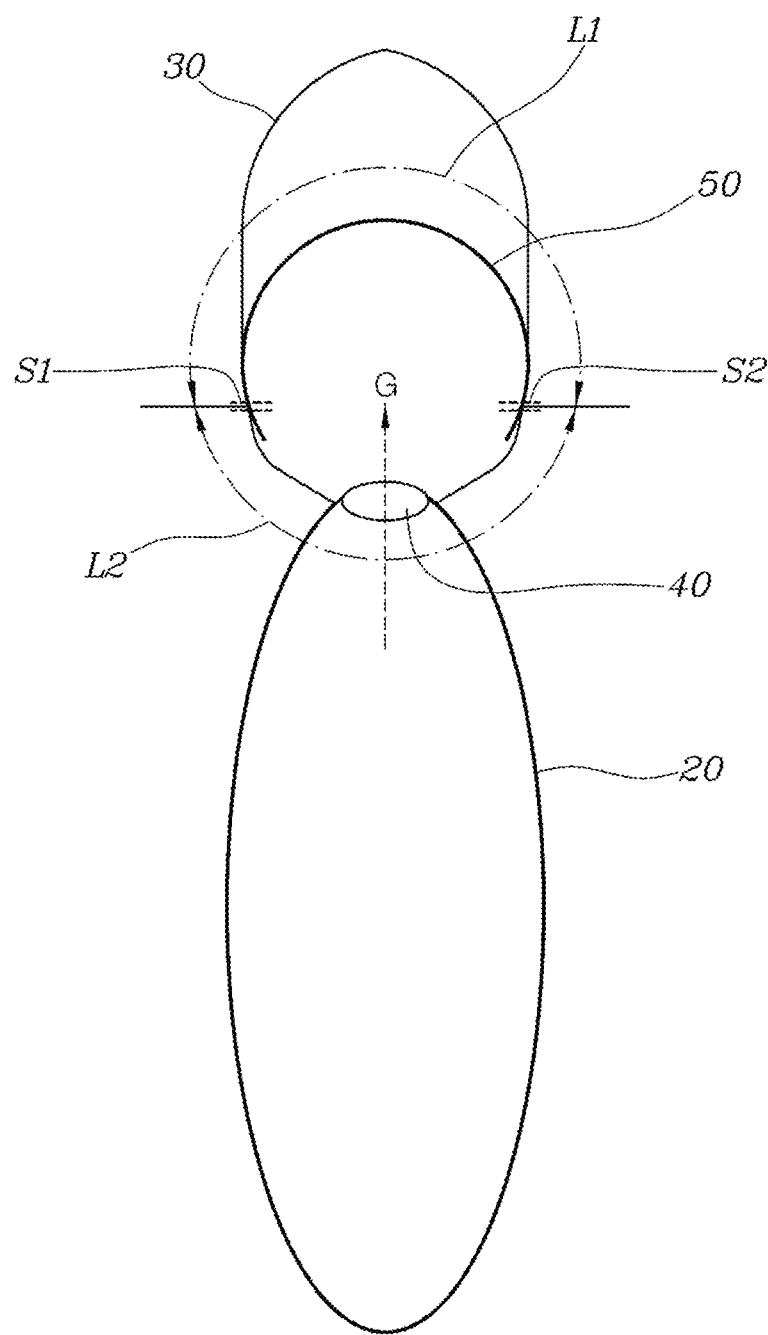
FIG. 2 is a view showing the side air bag apparatus according to the present invention.
Figure 3:
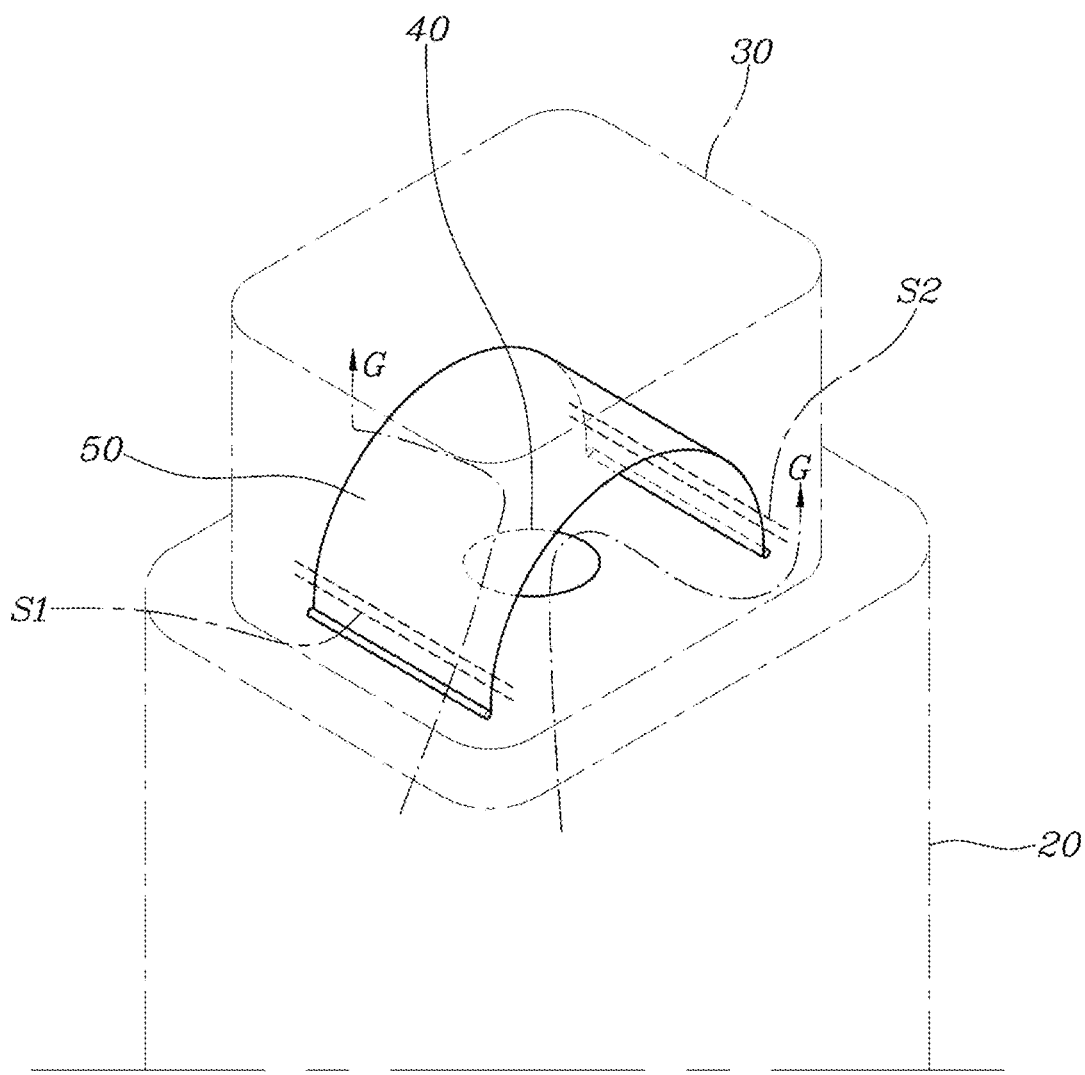
FIG. 3 is a view showing a valve member according to the present invention.

According to the present invention, as shown in FIGS. 1 to 4, the side air bag apparatus for a vehicle includes: an inflator 10 securely mounted to a seatback 1 and configured to generate airbag gas (G) during explosion; a first cushion 20 configured to be expanded to protrude toward a side surface of the seatback 1 by pressure of the airbag gas (G) generated during explosion of the inflator 10 after being folded with a hiding state in the seatback 1 so as to protect an upper body area 2 of a passenger who has adopted the relax mode; and a second cushion 30 connected to the first cushion 20 and configured to be expanded by the pressure of the airbag gas (G) transmitted through the first cushion 20 and to protect a head area 3 who had adopted the relax mode.

The inflator 10 is securely mounted to a seatback frame and is configured to activate by control of an airbag controller when a side collision accident occurs, and the airbag gas (G) is generated during the explosion of the inflator 10 and the first cushion 20 is expanded by the airbag gas (G) generated during the explosion of the inflator 10.

The first cushion 20 is folded in a state of hiding in the seatback 1 and then is expanded to protrude forward from the side surface of the seatback 1 by the pressure of the airbag gas (G), and the expanded first cushion 20 covers and protects the upper body area 2 of the seated passenger.

The upper body area 2 of the passenger protected by the first cushion 20 is preferably an area from shoulder to pelvis (including chest and abdomen) of the passenger who adopted the relax mode, but the present invention is not limited thereto.

The second cushion 30 is expanded by receiving the airbag gas (G) from the first cushion 20, and the expanded second cushion 30 covers and protects a side surface of the head area 3 of the seated passenger.

The head area 3 of the passenger protected by the second cushion 30 is preferably an area including the head and neck of the passenger who has adopted the relax mode, but the present invention is not limited thereto.

The first cushion 20 and the second cushion 30 are configured such that inside portions thereof are connected to each other through one vent hole 40 so that the airbag gas (G) may move through the vent hole. The vent hole 40 is configured to be opened and closed by a valve member 50 in response to pressure of the first cushion 20 or pressure of the second cushion 30.

According to the present invention, the valve member 50 is a flap valve, which is located in the second cushion 30 and has opposite ends coupled to the second cushion 30 by sewing. The valve member 50 is configured such that an intermediate portion between the opposite ends moves with flapping in response to the pressure of the first cushion 20 or the pressure of the second cushion 30 so as to be operated to open or close the vent hole 40.

The valve member 50 is preferably made of a felt material enabling sewing-coupling with the second cushion 30. Additionally, a fabric material, a plastic material with a thin thickness capable of having elasticity may be used as the valve member 50.

The opposite ends of the valve member 50 are coupled to the second cushion 30 by sewing, and on the basis of two sewing lines (S1 and S2), length L1 of the valve member 50 located between the two sewing lines (S1 and S2) is formed longer than length L2 of the second cushion 30 located between the two sewing lines (S1 and S2) and including the vent hole 40. Whereby, when external force is applied to the second cushion 30 and the pressure of the second cushion 30 increases, the valve member 50 may seal the vent hole 40.

Hereinbelow, inflating process of the side air bag apparatus according to the present invention will be described.

When a side collision accident occurs, the airbag controller controls the inflator 10 to activate, the airbag gas (G) is generated during the explosion of the inflator 10, and the first cushion 20 is expanded by the airbag gas (G) generated during the explosion of the inflator 10 (state A in FIG. 4).

The first cushion 20 is expanded to protrude forward from the side surface of the seatback 1 by the pressure of the airbag gas (G) after being folded with the hiding state in the seatback 1. The expanded first cushion 20 covers and protects the upper body area (2, area including shoulder, pelvis, chest, and abdomen) of the passenger who has adopted the relax mode from the side surface thereof.

While the first cushion 20 is expanded, the upper body area 2 of the passenger moves toward the first cushion 20 due to inertia during the collision accident and presses the first cushion 20 (arrow F1), so the pressure of the first cushion 20 increases, and the increased pressure of the first cushion 20 is transmitted to the valve member 50 through the vent hole 40. In the valve member 50, the intermediate portion thereof between the opposite ends thereof moves toward the front of the second cushion 30 to open the vent hole 40 and the airbag gas (G) of the first cushion 20 is supplied to the second cushion 30 through the vent hole 40 so that the second cushion 30 is expanded (state B in FIG. 4).

The expanded second cushion 30 covers and protects the head area 3, from the side surface of the head area 3, including the neck of the passenger who has adopted the relax mode.

When the second cushion 30 is expanded and the head area 3 of the passenger moves toward the second cushion 30 due to inertia during the collision accident and presses the second cushion 30 (arrow F2), the pressure of the second cushion 30 increases and the increased pressure of the second cushion 30 is transmitted to the valve member 50, so the intermediate portion of the valve member 50 between opposite ends thereof moves in a direction where the vent hole 40 is located by the pressure of the second cushion 30 and thereby sealing the vent hole 40 (state C in FIG. 4)

As described above, when the valve member 50 blocks the vent hole 40 to be sealed with the expanded first cushion 20 and the expanded second cushion 30, the connection between the first cushion 20 and the second cushion 30 are blocked by the valve member 50, whereby the first cushion 20 and the second cushion 30 maintain individual internal pressure. As a result, the first cushion 20 may sufficiently protect the upper body area 2 of the passenger who has adopted the relax mode and the second cushion 30 may efficiently and sufficiently protect the head area 3 of the passenger who has adopted the relax mode.

As described above, the side air bag apparatus for a vehicle according to the embodiment of the present invention is configured to be a dual chamber including the first cushion 20 covering and protecting the upper body area 2 of the passenger who has adopted the relax mode with the rearward-tilted seatback 1 and the second cushion 30 covering and protecting the head area 3, whereby even the passenger in the relax mode may be efficiently protected.

The present invention is configured to expand successively the first cushion 20 and the second cushion 30 by using the one inflator 10 having a small capacity, whereby there is an advantage of inducing cost reduction and weight reduction.

The present invention is configured such that, when external force is applied to the second cushion 30 while the second cushion 30 is expanded, the valve member 50 located in the second cushion 30 blocks the vent hole 40 connecting the first cushion 20 to the second cushion 30, whereby the airbag gas (G) flowing into the second cushion 30 may be prevented from back-flowing into the first cushion 20, and the first cushion 20 and the second cushion 30 may respectively maintain internal pressure, and as a result, there is an advantage that the upper body area 2 and the head area 3 of the passenger who has adopted the relax mode may be efficiently protected by the first cushion 20 and the second cushion 30.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A side air bag apparatus for a vehicle, the side air bag apparatus comprising:
   an inflator securely mounted to a seatback and configured to generate airbag gas;
   a dual chamber including a first cushion and a second cushion,
      the first cushion is configured to be expanded to protrude towards a side surface of the seatback by pressure of the airbag gas generated from the inflator after being folded with a hiding state in the seatback and to protect an upper body area of a passenger who has adopted a relax mode;
      the second cushion is connected to the first cushion and configured to be expanded only by the pressure of the airbag gas transmitted thereto through the first cushion and to protect a head area of the passenger who has adopted the relax mode;
   a single vent hole configured to connect the first cushion and the second cushion to each other, such that the airbag gas is transmitted from the first cushion to the second cushion through the single vent hole; and
   a valve member configured to be operated to open and close the single vent hole in response to pressure of the first cushion or pressure of the second cushion, wherein the valve member is located in the second cushion and has opposite ends coupled to sides of the second cushion, by sewing, which is in contact with the head area when the second cushion is fully deployed,
   wherein, based on two sewing lines by which the opposite ends of the valve member and the second cushion are coupled to each other, a length of the valve member located between the two sewing lines is configured longer than a length of the second cushion including the single vent hole and located between the two sewing lines.

2. The side air bag apparatus of claim 1, wherein the first cushion and the second cushion are configured such that inside portions thereof are connected to each other through the single vent hole.

3. The side air bag apparatus of claim 1, wherein the upper body area of the passenger protected by the first cushion is an area from shoulder to pelvis.

4. The side air bag apparatus of claim 1, wherein the head area of the passenger protected by the second cushion is an area including a neck of the passenger.

5. The side air bag apparatus of claim 1, wherein the valve member is a flap valve and is configured such that an intermediate portion thereof between the opposite ends opens and closes the single vent hole in response to the pressure of the first cushion or the pressure of the second cushion.

6. The side air bag apparatus of claim 5, wherein the valve member is made of a felt material enabling sewing-coupling between the valve member and the second cushion.

7. The side air bag apparatus of claim 5, wherein, in a state in which the first cushion has been expanded by the airbag gas generated from the inflator, when the pressure of the first cushion increases as a passenger's upper body presses the first cushion, the valve member is operated to open the single vent hole by the pressure transmitted from the first cushion and the airbag gas of the first cushion is supplied to the second cushion through the single vent hole, so that the second cushion is expanded.

8. The side air bag apparatus of claim 7, wherein, in a state in which the second cushion has been expanded, when the pressure of the second cushion increases as the passenger's head presses the second cushion, the valve member is operated to seal the single vent hole by the pressure of the second cushion and connection between the first cushion and the second cushion is blocked by the valve member, so that the first and second cushions respectively maintain internal pressures thereof.

9. The side air bag apparatus of claim 8, wherein the valve member is configured to seal the single vent hole when the pressure of the second cushion increases as the head of the passenger presses the second cushion.

10. A side air bag apparatus for a vehicle, the side air bag apparatus comprising:
   an inflator securely mounted to a seatback and configured to generate airbag gas; and
   a dual chamber further comprising:
      a first cushion configured to be expanded to protrude towards a side surface of the seatback by pressure of the airbag gas generated from the inflator after being folded with a hiding state in the seatback and to protect an upper body area from shoulder to pelvis of a passenger who has adopted a relax mode;
      a second cushion connected to the first cushion and configured to be expanded by the pressure of the airbag gas transmitted thereto through the first cushion and to protect a head area of the passenger who has adopted the relax mode;
      a single vent hole configured to connect the first cushion and the second cushion to each other, such that the airbag gas is transmitted from the first cushion to the second cushion exclusively through the single vent hole; and
      a valve member configured to be operated to open and close the single vent hole in response to pressure of the first cushion or pressure of the second cushion, and wherein, in a state in which the first cushion has been expanded by the airbag gas generated from the inflator, when the pressure of the first cushion increases as a passenger's upper body presses the first cushion, the valve member is operated to open the single vent hole by the pressure transmitted from the first cushion and the airbag gas of the first cushion is supplied to the second cushion exclusively through the single vent hole, so that the second cushion is expanded, and further wherein the valve member is configured to seal the single vent hole when the pressure of the second cushion increases as the head of the passenger presses the second cushion, wherein the valve member is located in the second cushion and has opposite ends coupled to sides of the second cushion, by sewing, which is in contact with the head when the second cushion is fully deployed,
      wherein, based on two sewing lines by which the opposite ends of the valve member and the second cushion are coupled to each other, a length of the valve member located between the two sewing lines is configured longer than a length of the second cushion including the single vent hole and located between the two sewing lines.

* * * * *